United States Patent [19]
Kawakita et al.

[11] Patent Number: 5,540,576
[45] Date of Patent: Jul. 30, 1996

[54] APPARATUS HAVING A VACUUM CHAMBER FOR PRODUCING MOLDINGS

[75] Inventors: Yukio Kawakita; Shogo Sugiyama; Kazuhiko Suzuki, all of Nakashima-gun, Japan

[73] Assignee: Toyoda Gosei Co., Ltd., Japan

[21] Appl. No.: 202,189

[22] Filed: Feb. 24, 1994

[51] Int. Cl.$^6$ ................... B28B 7/00; B29C 45/64
[52] U.S. Cl. ................... 425/73; 425/85; 425/190; 425/215; 425/405.1; 425/546; 425/589; 425/DIG. 60; 264/102
[58] Field of Search ................... 425/4 R, 73, 74, 425/75, 85, 215, 405.1, 546, 589, DIG. 60, 405.2, 190; 249/160; 264/102

[56] References Cited

U.S. PATENT DOCUMENTS

| | | | |
|---|---|---|---|
| 275,730 | 4/1883 | Swan | 249/161 |
| 3,097,397 | 7/1963 | Leach et al. | 249/161 |
| 3,754,846 | 8/1973 | Choate | 425/405.1 |
| 4,333,897 | 6/1982 | Hayashi | 425/4 R |
| 4,790,510 | 12/1988 | Takamatsu et al. | 249/161 |
| 4,867,924 | 9/1989 | Schilkey | 425/405.1 |
| 4,988,271 | 1/1991 | Kumasaka | 425/73 |
| 5,112,207 | 5/1992 | Pinsonneault | 249/161 |
| 5,238,387 | 8/1993 | Hama et al. | 425/441 |

FOREIGN PATENT DOCUMENTS

| | | | |
|---|---|---|---|
| 461522 | 12/1991 | European Pat. Off. . | |
| 4124342 | 1/1993 | Germany | 425/577 |
| 51-24661 | 2/1976 | Japan | 425/577 |
| 7937 | 3/1978 | Japan | 425/405.1 |
| 62-164709 | 7/1987 | Japan . | |
| 62-249721 | 10/1987 | Japan | 425/577 |
| 63-15719 | 1/1988 | Japan | 425/577 |
| 2-283414 | 11/1990 | Japan | 425/215 |
| 3-221423 | 9/1991 | Japan | 425/577 |
| 4-226313 | 8/1992 | Japan . | |
| 4-312809 | 11/1992 | Japan | 425/577 |

*Primary Examiner*—Jan H. Silbaugh
*Assistant Examiner*—Vi Duong Dang
*Attorney, Agent, or Firm*—Cushman Darby & Cushman, L.L.P.

[57] ABSTRACT

An apparatus having a vacuum chamber or chamber, wherein the changing manner of the mold can be improved, the sealing structure of the vacuum chamber or an injection nozzle is simple, and the cost of the apparatus is reduced and preservation of the apparatus is improved. The apparatus has a vacuum chamber for surrounding a mold into an airtight situation. The vacuum chamber includes an upper casing and a lower casing, and they are being divided by a parting line defined by mating peripheral edge surfaces which incline upwardly from an operator-side to an opposite-side. An O-ring as a sealing member of the vacuum chamber is positioned between the peripheral edge surfaces.

7 Claims, 4 Drawing Sheets

APPARATUS HAVING A VACUUM CHAMBER FOR PRODUCING MOLDINGS

BACKGROUND OF THE INVENTION

1. Field of the Invention

The present invention relates to an apparatus for producing synthetic resin moldings or rubber moldings in an atmosphere of reduced pressure in a vacuum chamber, and the apparatus is particularly suitable to make polyurethane foams, for example automotive steering wheel coverings, steering wheel pads, etc., by reaction injection molding (RIM hereinafter) in the atmosphere of reduced pressure in the vacuum chamber.

2. Description of Related Art

Heretobefore, in the field of producing sysnthetic resin moldings, an atmosphere of reduced pressure is generally made by a vacuum ppot 51 which is shown in FIG. 6. (See Japanese Patent Laid-open publicatoin No. Sho 62-164709.) For example, a molding container 52 is located in the vacuum pot 51. A polyurethane material which includes water as a blowing agent is poured into the molding container 52. A lid 53 of the vacuum pot 51 is closed, and the vacuum pot 51 becomes airtight. Then, the vacuum pot 51 is vented to an atmosphere of reduced pressure by a vacuum pump 54, and the polyurethane material is foamed.

However, if RIM is carried out in the vacuum pot 51, it is necessary to contact an injection nozzle of a mixing head of an injecting mechanism (not shown) with a mold, such as molding container 52, in the vacuum pot 51 through the wall of the vacuum pot. In such a case, a sealing mechanism between the vacuum pot and the injection nozzle, moves along wich movement of the vacuum pot in an upward and downward direction. The injection nozzle itself will slide into and out of that sealing mechanism. This is a very intricate structure. Also, before and after RIM operations, the vacuum pot must move, relative to the mold, for example, downwardly, to expose and open the mold and upwardly to close the mold.

In such a case, there are some problems. Many attachments are necessary, and that increases the cost of the apparatus. Also, preservation of the apparatus is a problem because of the intricate sealing mechanism.

Therefore, we preliminarily proposed to provide an apparatus which had a vacuum box comprising a divided upper casing and a divided lower casing, and a mold which is surrounded by the vacuum box to an airtight situation. (See Japanese Patent Laid-open publication No. Hei 04-226313, which is now filed in the U.S. patent application Ser. No. 08/268,661, now U.S. Pat. No. 5,464,582.)

However, this apparatus has a remaining problem which is that it is difficult to change the mold, especially since the mold is surrounded in the vacuum box.

The present invention has been developed to overcome the problems associated with the conventional apparatus described above. An object of the present invention is to provide apparatus havine a vacuum chamber, wherein the changing manner of the mold can be improved. Another object of the present invention is to provide apparatus, wherein the sealing mechanism of the vacuum chamber or the injection nozzle is simple. The other object of the present invention is to provide apparatus, wherein the cost of the apparatus is reduced, and preservation of the apparatus is improved.

SUMMARY OF THE INVENTION

The above-mentioned objects are achieved by the apparatus in accordance with the description of the present invention. The apparatus has a vacuum box or chamber for surrounding the mold into the airtight situation. The vacuum chamber comprises an upper casing and a lower casing, and they are divided at the parting surface which is inclined from the operator-side to the opposite-side upwardly. And a sealing mechanism of the vacuum chamber is located on the parting surface. In this case, the parting surface is not only a straight-and-inclined surface but also a curved-and-inclined surface or a stepped-and-inclined surface.

Also, the mold is divided into an upper part and a lower part. The upper part and the upper casing are fixed on an upper plate of a mold-clamping device, and the lower part and the lower casing are fixed on a lower plate of the mold-clamping device.

Further, according to the above-mentioned apparatus, an injection nozzle for synthetic material is connected to the lower part through the lower casing, and the lower casing has a sealing mechanism between the casing and the injection nozzle.

According to the apparatus, as the vacuum chamber is comprised of the upper casing and the lower casing for dividing the above-mentioned inclined surface, the level of an upper edge of the operator-side of the lower casing is lower than the opposite-side relatively. As there is a large opening formed in the front of the mold upon opening, it is easy to change the mold, or to clean the mold, or to spray a mold-releasing agent or a mold-coating on the cavity of the mold, through this opening. It is also sealed between the upper casing and the lower casing by a sealing mechanism located on the parting surface, for example, by an O-ring, making this sealing mechanism easy to use.

Also, according to the apparatus, the mold-clamping device is carried out, and the lower plate and the upper plate are relatively moved. Therefore, the opening and closing of the upper and lower part of the mold, and the opening and closing of the upper and lower casing of the vacuum chamber are carried out simultaneously.

Further, according to the apparatus, the sealing mechanism of the injection nozzle located on the lower casing is not necessary to go up and down and slide as in the conventional apparatus. And as the sealing mechanism is located on the fixed position, an easy mechanism can be used, for example, an O-ring.

The apparatus having the vacuum chamber of the present invention has the above-mentioned structure, and has effects as following.

The changing manner of the mold can be improved.

It is easy to carry out the opening and closing of the upper and lower parts of the mold, and the opening and closing of the upper and lower casings of the vacuum chamber by the easy mold-clamping device, simultaneously. And that can reduce the cost of the apparatus.

The sealing mechanism of the injection nozzle can be simple, and the preservation of the apparatus can be improved.

Other objects, features, and characteristics of the present invention, as well as the methods and operation and functions of the related elements of the structure, will become apparent upon consideration of the following description and the appended claims with reference to the accompanying drawings, all of which form a part of this specification, wherein like reference numerals designate corresponding parts in the various figures.

DETAILED DESCRIPTION OF THE PRESENTLY PREFERRED EXEMPLARY EMBODIMENTS

Figure 1:
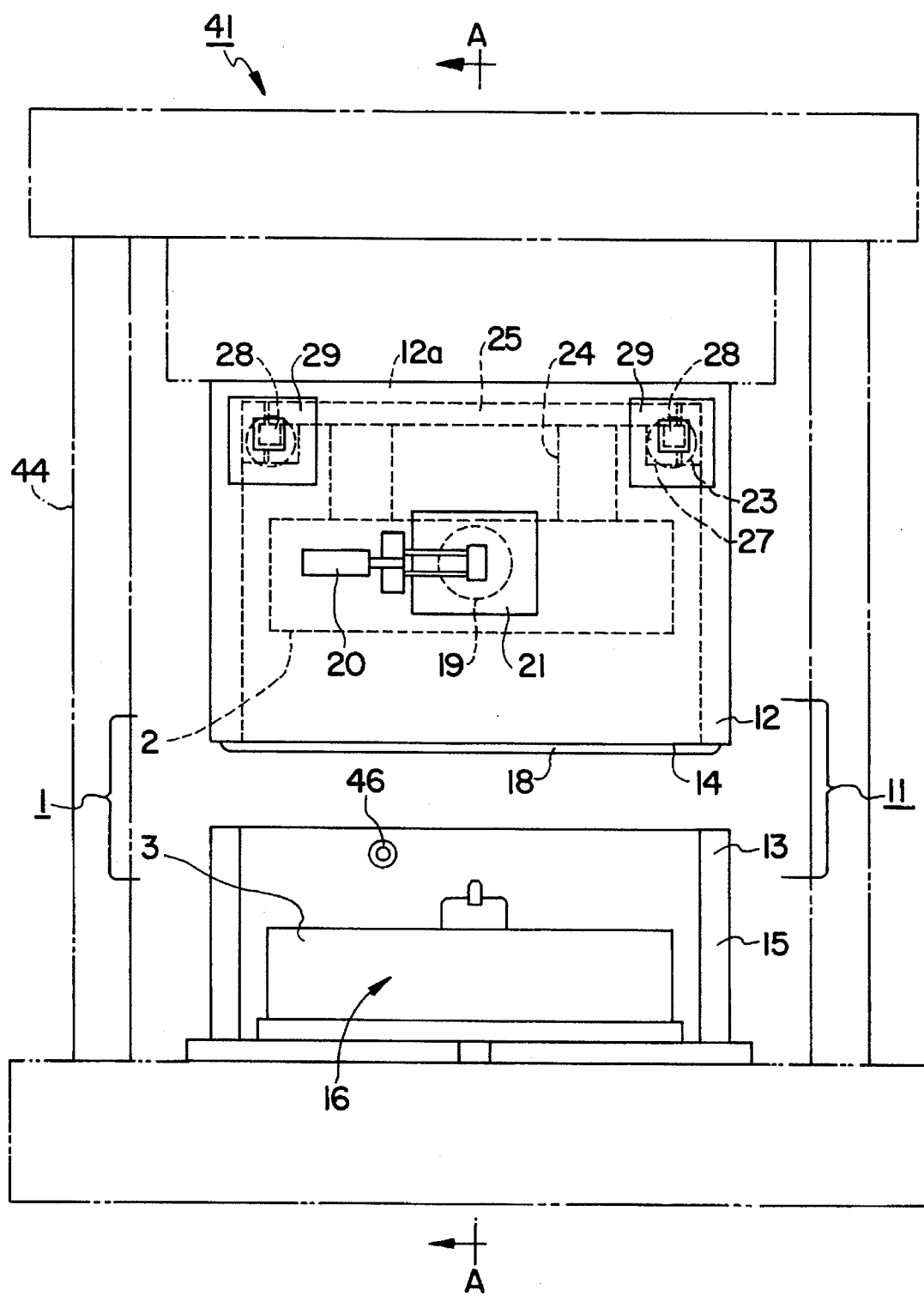
FIG. 1 is a front elevational view showing the apparatus in the open situation according to an embodiment of the present invention.

Hereinafter, an embodiment of the present invention in the apparatus to produce a covering of a polyurethane on a steering wheel ring portion by RIM will be described with reference to FIGS. 1 to 5. This embodiment employs an apparatus which is made up of a mold 1, a vacuum chamber 11, a material injecting mechanism 31, and a mold-clamping device 41. A detailed description of each component is given below.

The mold 1 is made up of an upper part 2 and a lower part 3, and they are divided. That division defines a parting line (PL) along with parting line surfaces between the upper part 2 and the lower part 3 has cavity surface 5 which is formed of a ring-shaped cavity 4 when closed, a flowing groove 6 which allows the material to flow into the cavity 4. When the upper and lower parts are closed, the parting line surfaces form a clearance according to a working-accuracy. The upper part 2 has a vent hole 7 at the final fill position of the polyurethane material in the cavity 4.

Next, the vacuum chamber 11 has a rectangular parallelepiped shape, and is comprised of an upper casing 12 and a lower casing 13. They are divided at the parting surfaces 14, 15 which are formed as inclined surfaces from the operator-side (left-side in FIG. 2) to the opposite-side (right-side in FIG. 2) upwardly. The level of the upper edge of the operator-side or front wall of the lower casing is lower in height than the opposite-side or rear wall. Therefore, a large opening is formed in front of the lower part of the mold when the vacuum chamber is opened. The large opening makes it easy to change the mold, clean the mold, to spray a mold-release agent, or to apply a mold-coating on the cavity of the mold. In this embodiment, the parting surface 15 of the lower casing 13 is started from the front edge of a bottom plate 13a, and there is no front wall of the lower casing 13. Therefore, a large opening 16 is formed in front of the lower part 3. When the vacuum chamber 11 is opened. Further, as noted previously, the parting surfaces, such as 14 and 15, can be straight-and-inclined surfaces, curved-and-inclined surfaces, or stepped-and-inclined surfaces.

Figure 3:
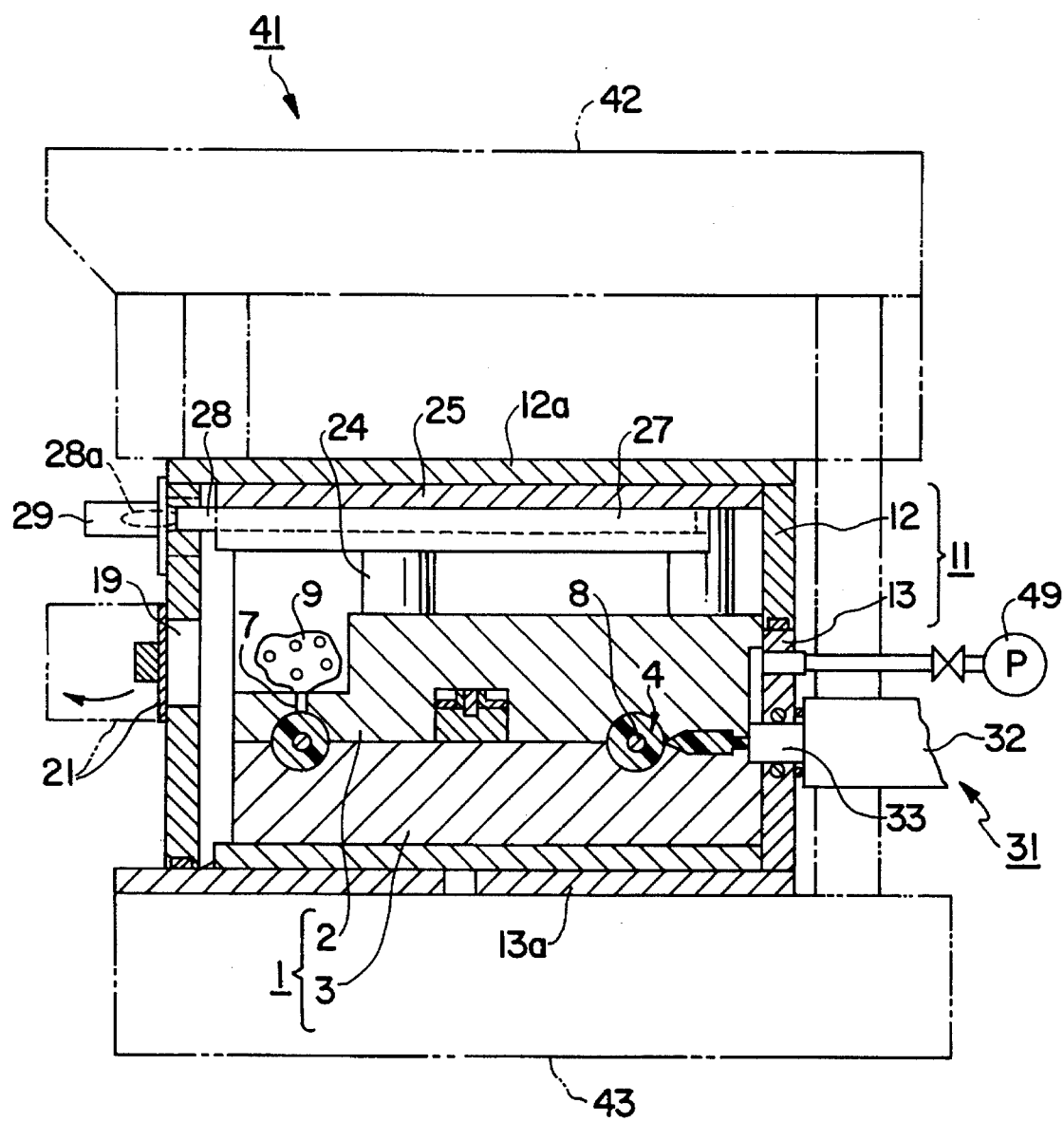
FIG. 3 is a partial cross-sectional view as in FIG. 2 in the closed situation.
Figure 4:
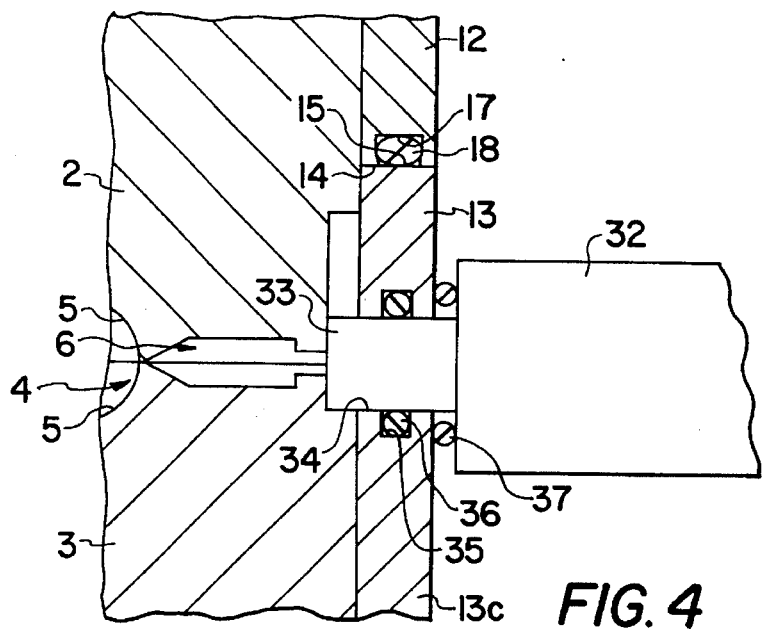
FIG. 4 is an enlarged, partial cross-sectional view showing the area around the injection nozzle of this apparatus.
Figure 5:
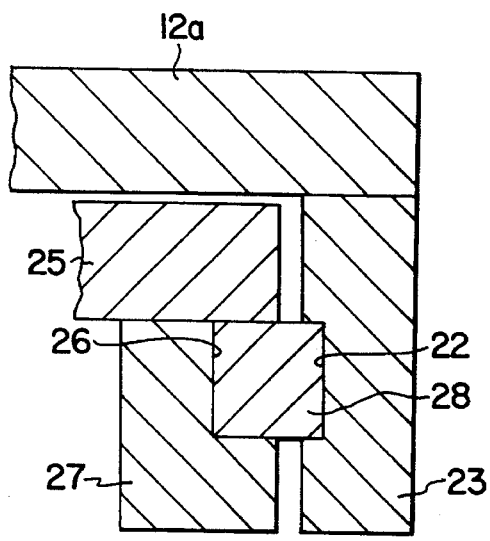
FIG. 5 is an enlarged, partial cross-sectional view showing the fixed structure of the upper mold part of this apparatus.
Figure 6:
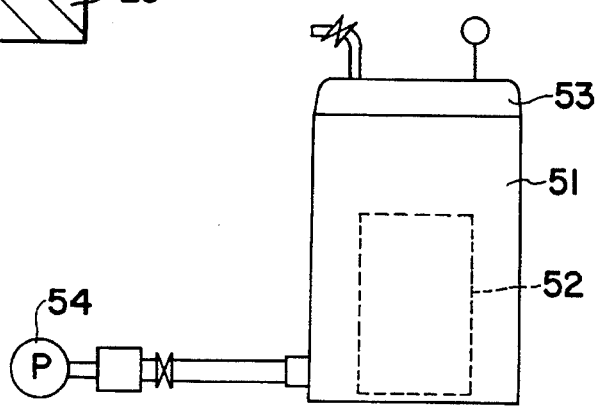
FIG. 6 is a front elevational view showing prior art apparatus.

Also, the parting surface 14 of the upper casing 12 is provided with a groove 17 over the entire periphery, and an O-ring 18 is fixed as just protruding downwardly in the groove 17. O-ring 18 makes an easy sealing mechanism of the vacuum chamber 11. As shown in FIGS. 3 and 4, the O-ring 18 contacts with the parting surface 15 of the lower casing 13, and effects a seal between the upper casing 12 and the lower casing 13 when the vacuum chamber 11 is closed.

Also, the back wall 13c of the lower casing 13 is provided with a suction port 46 which is connected to a vacuum pump 49 through a suction hose 47 and a valve 48 to evacuate the vacuum chamber 11. On the other hand, a front wall 12b of the upper casing 12 has a taking-out opening 19 through itself for a discharged part 9 which is mentioned later. The taking-out opening 19 is opened and closed by a lid 21 which is actuated by cylinder 20 fixed on the front surface of the front wall 12b of the upper casing 12.

Next, the material injecting mechanism 31 has a mixing head 32 in which a polyol component and an isocyanate component can be vigorously mixed. These components can be recirculated when mixing is not occurring. An injection nozzle 33 which is provided on the top of the mixing head 32 is connected to the flowing groove 6 of the lower part 3 through a hole 34 which is formed on the back wall 13c of the lower casing 13. As shown in FIG. 4, a groove 35 is formed on the periphery of an inner wall of the hole 34. An O-ring 36 made of rubber is fixed in this groove 35. The O-ring 36 contacts with the outer surface of the injection nozzle 33, and seals between the hole 34 and the injection nozzle 33. An O-ring 37 is also provided between the end surface of the mixing head 32 which is located near the end portion of the injection nozzle 33 and the back surface of the back wall 13c. And it seals between them. Those O-rings 36, 37 comprise a simple and effective sealing mechanism.

The mold-clamping device 41 has a plurality of standing slide-guides 44, an upper plate 42 which can slide to go up and down along the slide-guides 44, a lower plate 43 which is fixed upon the slide-guides 44. Then, the upper part 2 and the upper casing 12 are fixed on the upper plate 42, and the lower part 3 and the lower casing 13 are fixed on the lower plate 43, respectively, as follows.

A top plate 12a of the upper casing 12 is positively fixed on the under surface of the upper plate 42. Holders 23 which have rail-grooves 22 on the inside surfaces are fixed on the left and right side portions of the under surface of the upper plate 42. Also, the upper part 2 is supported by a supporting plate 25 through supporting-rods 24. Holders 27 which have rail-grooves 26 on the outside surfaces are fixed on the left and right side portions of the under surface of the supporting plate 25. Rail-grooves 22, 26 which are formed to be in accord with both holders 23, 27 are inserted in key-rods 28 to be removable, the upper part 2 is fixed on the upper casing 12 to be removable. Numeral 29 is a cover which is fixed on and in front of the front wall 12b. The covers 29 can house pull-top rings 28a which are located at the front end portion of the key-rods 28.

Now follows in ordered steps an explanation of how the apparatus of this embodiment is used in the covering of a steering wheel with polyurethane during RIM operation.

Figure 2:
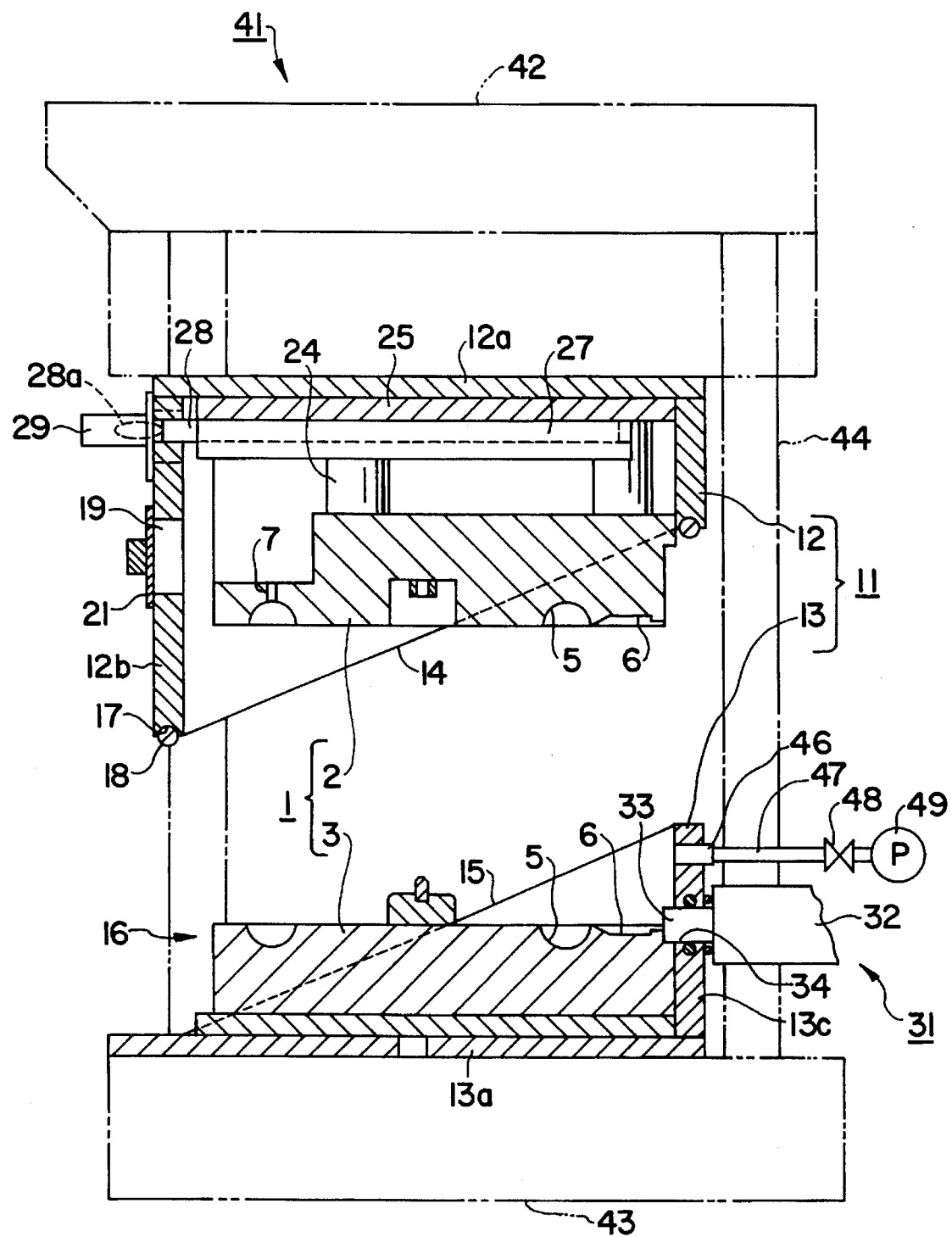
FIG. 2 is a partial cross-sectional view of the apparatus taken along a line A—A in FIG. 1.

(1) The upper part 2 and the lower part 3 of the mold 1 are cleaned while they are open as shown in FIGS. 1 and 2, or a mold-releasing agent or a mold-coating is sprayed on the cavity surface 5. It is easy to carry out this operation through the large opening 16. On the other hand, a bottom plate 13a of the lower casing 13 is certainly fixed on the upper surface of the lower plate 43. The lower part 3 is fixed on the upper surface of the bottom plate 13a by removable screws, which are not shown in the drawings.

(2) After the metal core 8 of the steering wheel is mounted on the lower part 3, as shown in FIG. 3, the upper plate 42 goes down. The upper part 2 and the lower part 3 are closed and form the cavity 4. At the same time, the upper casing 12 and the lower casing 13 are closed and to make the vacuum chamber 11 airtight.

(3) Vacuum pump 49 evacuates the vacuum box 11 until a predetermined reduced pressure level (for example, 50

Torr or below), and the cavity 4 is evacuated through the clearance between the parting surfaces into the reduced pressure level.

(4) The polyurethane material (which contains substantially no blowing agent) is injected into the cavity 4 through the injection nozzle 33, and RIM operation is carried out. At this time, vaporizing gas, which are originally slightly present in the polyurethane material, under reduced pressure, cause the polyurethane material at the center of the cavity far from the cavity surface 5 to form a highly expanded core. Also, releasing gases, under reduced pressure, causes the surface of the polyurethane material in contact with the cavity surface 5 to form a non-porous solid skin containing very few minute bubbles.

An end of flowing polyurethane material reaches the vent hole 7 and blows off from the vent hole 7. Then, it is cured and becomes the discharged part 9.

(5) After the polyurethane material has cured, the upper plate 42 is raised so the upper part 2 and the lower part 3 are opened. At the same time, the upper casing 12 and the lower casing 13 are opened. The lid 21 is opened, and the discharged part 9 is removed. Then, the produced steering wheel is removed from the mold.

Further, when the mold 1 needs to be changed to another mold, the following procedure is carried out.

The key-rod 28 is removed from the rail-grooves 22, 26, the upper part 2 is removed from the upper casing 12, and the lower part 3 is removed from the lower casing 13 for unfastening the screws which are not shown in the drawings. Then, these upper and lower parts are changed to other upper and lower parts. At this time, especially, according to the lower part 3, it is easy to carry out the change through the large opening 16 which is formed when the vacuum chamber 11 is opened.

As many widely different embodiments of this invention may be made without departing from the spirit and scope thereof, it is to be understood that the invention is not limited to the specific embodiments thereof except as defined in the appended claims.

What is claimed is:

1. An apparatus for producing moldings comprising:
   a mold comprised of a pair of mating upper and lower mold members that define a cavity therebetween;
   a vacuum chamber fitted over and to said mold so that said mold can be held in an evacuated condition;
   a clamping assembly connected to each of said upper and lower mold members through said vacuum chamber, said clamping assembly being movable between a closed clamped condition and an open condition whereby the upper and lower mold members are spaced apart;
   a vacuum pump connected to said vacuum chamber;
   a material injecting assembly operatively attached to said mold so that material can be injected into the cavity;
   said vacuum chamber being defined by an upper casing and a lower casing that interfit over said upper and lower mold members, respectively, said upper and lower casings being divided by a parting line defined by mating peripheral edge surfaces which incline upwardly at an angle extending away from one side toward an opposite-side thereof, said lower casing having a bottom plate, upwardly sloping side walls and a rear wall, said upper casing sealing along said one side directly onto said bottom plate so that said mold can be removed along said bottom plate through an opening between said upper casing and said bottom plate when the clamping assembly is in the open condition; and
   a seal member being positioned between said peripheral edge surfaces.

2. The apparatus for producing moldings as set forth in claim 1, wherein said upper mold member and said upper casing of said vacuum chamber being fixed on an upper plate of said clamping assembly, and said lower mold member and said lower casing being fixed on a lower plate of said clamping assembly.

3. The apparatus for producing moldings as set forth in claim 2, wherein an injection nozzle of said material injecting assembly is connected to said lower mold member through said lower casing, and said lower casing including a sealing member positioned about the injection nozzle.

4. The apparatus for producing moldings as set forth in claim 3, wherein said sealing member comprises an O-ring.

5. The apparatus for producing moldings as set forth in claim 1, wherein said seal member being positioned between said peripheral edge surfaces is an O-ring.

6. An apparatus for producing moldings comprising:
   a mold comprised of a pair of mating upper and lower mold members that define a cavity therebetween;
   a vacuum chamber fitted over and to said mold so that said mold can be held in an evacuated condition, said vacuum chamber being defined by an upper casing and a lower casing that interfit over said upper and lower mold members, respectively, said upper and lower casings being divided by a parting line defined by mating peripheral edge surfaces which incline upwardly at an angle extending away from one side toward an opposite-side thereof, said lower casing having a bottom plate, upwardly sloping side walls and a rear wall, said upper casing sealing along said one side directly onto said bottom plate so that said mold can be removed along said bottom plate through an opening between said upper casing and said bottom plate when the clamping assembly is in the open condition;
   a vacuum pump connected to said vacuum chamber; and
   a material injecting assembly operatively attached to said mold so that material can be injected into the cavity.

7. The apparatus for producing moldings as set forth in claim 6, wherein said upper mold member and said upper casing of said vacuum chamber being fixed on an upper plate of said clamping assembly, and said lower mold member and said lower casing being fixed on a lower plate of said clamping assembly.

\* \* \* \* \*